United States Patent
Toda et al.

(10) Patent No.: US 7,130,435 B1
(45) Date of Patent: Oct. 31, 2006

(54) COMPONENT SELECTION CONTROL SYSTEM

(75) Inventors: Hideharu Toda, Katano (JP); Shoji Arikuma, Neyagawa (JP)

(73) Assignees: Sanyo Electric Co. Ltd., Moriguchi (JP); Sanyo Technosound Co. Ltd., Daito (JP)

( * ) Notice: Subject to any disclaimer, the term of this patent is extended or adjusted under 35 U.S.C. 154(b) by 0 days.

(21) Appl. No.: 09/579,275

(22) Filed: May 26, 2000

(30) Foreign Application Priority Data

May 28, 1999 (JP) ................................. 11-149429

(51) Int. Cl.
*H02B 1/00* (2006.01)
(52) U.S. Cl. ........................ 381/123; 700/94; 381/77; 348/705; 386/99
(58) Field of Classification Search ................ 381/77, 381/80, 81, 123, 61, 119, 111; 340/825.24–825.25, 340/384.7, 2.1, 2.8; 700/94; 386/46, 1, 386/4, 52, 39, 99, 97; 348/705; 369/86
See application file for complete search history.

(56) References Cited

U.S. PATENT DOCUMENTS

| | | | | |
|---|---|---|---|---|
| 4,095,261 A | * | 6/1978 | Rodriguez | 360/13 |
| 4,524,452 A | * | 6/1985 | Marshak | 381/28 |
| 5,144,548 A | * | 9/1992 | Salandro | 700/9 |
| 5,243,640 A | * | 9/1993 | Hadley et al. | 455/426.1 |
| 5,414,417 A | * | 5/1995 | Heo | 340/825.25 |
| 5,761,320 A | * | 6/1998 | Farinelli et al. | 381/81 |
| 5,838,393 A | * | 11/1998 | Simpson et al. | 348/705 |
| 6,492,909 B1 | * | 12/2002 | Washikawa et al. | 340/825.24 |
| 6,636,931 B1 | * | 10/2003 | Shah et al. | 710/317 |
| 6,868,296 B1 | * | 3/2005 | Arikuma et al. | 700/94 |

FOREIGN PATENT DOCUMENTS

| | | |
|---|---|---|
| JP | 57-148479 | 9/1982 |
| JP | 60-22883 | 2/1985 |
| JP | 8-275082 | 10/1996 |

OTHER PUBLICATIONS

Copy of Japanese Office Action dated Sep. 24, 2003.

* cited by examiner

*Primary Examiner*—Vivian Chin
*Assistant Examiner*—Lun-See Lao
(74) *Attorney, Agent, or Firm*—Armstrong, Kratz, Quintos, Hanson, & Brooks, LLP.

(57) ABSTRACT

The invention provides a component selection control system comprising signal output components 2 to 5, signal input components 4, 5, and an amplifier unit 1 having these components 2 to 5 connected thereto. The signal output components 2 to 5 have respective on-off switches 23, 33, 44, 54 provided on signal output lines 73 to 76 for delivering audio signals to the amplifier unit 1 therethrough, and the amplifier unit 1 has a common input terminal g. The signal output lines 73 to 76 of the output components 2 to 5 are connected to one another at a point connected to a common signal line 71, which is connected to the common input terminal g of the amplifier unit 1. This arrangement greatly reduces the numbers of signal lines and terminals required for connecting the components 2 to 5 to the amplifier unit 1.

3 Claims, 3 Drawing Sheets

COMPONENT SELECTION CONTROL SYSTEM

FIELD OF THE INVENTION

The present invention relates to component selection systems which comprise a plurality of components such as a tuner, CD player, tape recorder, MD player, DVD player and amplifier and which are adapted to select one signal output component from among these components to feed an audio signal and/or video signal (AV signal) output from the selected component to other signal input component.

BACKGROUND OF THE INVENTION

Audio component systems are already in wide use which comprise a plurality of audio components such as a tuner, CD player, tape recorder and MD player as connected to one another.

For example, FIG. 4 shows an audio component system which comprises audio components, i.e., a tuner 20, CD player 30, tape recorder 40 and MD player 50, which are connected to an amplifier unit 9. A speaker 6 is connected to the output terminal of the amplifier unit 9 for delivering as its sound output an audio signal sent out from one audio output component selected by the amplifier unit 9, e.g., from the CD player 30. Further one audio output component selected by the amplifier unit 9, e.g., the tuner 20, feeds an audio signal to one audio input component, e.g., to the MD player 50, which records the audio signal.

The amplifier unit 9 has a plurality of signal input terminals a, b, c, d having connected thereto signal output lines 81 to 84 extending from the audio output components, and a plurality of signal output terminals e, f having connected thereto signal input lines 85, 86 extending from the audio input components.

The signal input terminals a, b, c and d are connected via a selector 91 to a signal processing system comprising a preamplifier 92, audio signal processing circuit 93 and post amplifier 94, and an audio signal is delivered to the speaker 6 via the signal processing system. The output terminal of the preamplifier 92 is connected to the signal output terminals e, f through a plurality of on-off switches 95, 96, and an audio signal is delivered from the terminal e or f to the tape recorder 40 or MD player 50.

The selector 91 and the on-off switches 95, 96 are controlled by a control circuit 98 to realize an operation in accordance with the manipulation of an input unit 97 by the user. For example, when the audio signal to be produced by the CD player 30 is to be recorded on an MD (mini disk) by the MD player 50, the input unit 97 is manipulated to select the CD player 30 as a signal output component and the MD player 50 as a signal input component, whereupon the selector 91 is switched to the input terminal connected to the CD player 30, the on-off switch 95 connected to the tape recorder 40 is opened, and the on-off switch 96 connected to the MD player 50 is closed.

Consequently, the audio signal from the CD player 30 is fed to the MD layer 50 by way of the selector 91, preamplifier 92 and on-off switch 96 and recorded on the MD.

With the conventional audio component system described, however, the signal output lines 81 to 84 and the signal input lines 85, 86 each comprise three conductors, i.e., a right-channel signal conductor, left-channel signal conductor and ground conductor. Accordingly, for example when the connection of the four audio components 20, 30, 40, 50 are to be connected to the amplifier unit 9 as illustrated, there is a need to use twelve signal conductors in all, and the amplifier unit 9 needs to be provided with twelve signal input or output terminals for the connection of these twelve signal conductors. The numbers of the signal conductors and signal input or output terminals required increase with an increase in the number of audio components providing the system.

As a result, the signal input and output terminal portions of the amplifier unit 9 occupy an increased area, not only making the amplifier unit 9 greater in size but also entailing the problem of an increased parts cost due to the increase in the number of signal conductors or lines and the problem of a cumbersome signal line connecting procedure by the user.

SUMMARY OF THE INVENTION

Accordingly, an object of the present invention is to provide a component selection control system which is greatly reduced in the numbers of signal conductors or lines and terminals conventionally required for the connection of components.

The present invention provides a component selection control system comprising a plurality of signal output components for outputting AV signals including audio signals and/or video signals, at least one signal input component for receiving the AV signal, and a signal processing control unit having connected thereto the signal output components and the signal input component. The signal processing control unit is operable to process the AV signal delivered from desired one of the signal output components as required for sound and/or image reproduction and to feed the AV signal delivered from the desired signal output component to the signal input component.

The signal output components each have an on-off switch provided on a signal output line for delivering the AV signal to the signal processing control unit therethrough. The signal processing control unit has a common input terminal for receiving the AV signal from the desired signal output component. The signal output lines of the signal output components are connected to one another at a point connected to the common input terminal of the control unit. One signal output component for feeding its AV signal to the signal processing control unit is selected by controlling the on-off switches for opening or closing.

With the component selection control system of the invention described, one of the signal output components desired is selected to feed the AV signal to be delivered from the selected output component to the signal input component. In this case, the on-off switch provided in the desired signal output component is closed, and the on-off switches of the other output components are opened, whereby the AV signal delivered from the signal output component is fed to the common input terminal of the signal processing control unit through the closed on-off switch.

Since the on-off switches of the other signal output components are turned off, it is unlikely that the AV signals delivered from these output components will be fed to the control unit.

The AV signal fed to the signal processing control unit is processed as required for sound and/or image reproduction, then sent to a subsequent circuit and output as a sound and/or image. Alternatively, the AV signal fed to the control unit is fed to the signal input component and recorded by the input component.

With the component selection control system of the invention described, the signal output lines extending from the respective signal output components are connected, as connected to one another, to the common input terminal of the signal processing control unit, so that the numbers of signal lines and terminals to be connected to the common input terminal are reduced from the corresponding numbers of lines and terminals conventionally used to a fraction of the number of signal output components.

According to an embodiment of the invention, the signal processing control unit has a common output terminal for delivering the AV signal to the signal input component. The common output terminal is connected to a signal input line of the input component. With this embodiment, the AV signal delivered from the selected signal output component to the signal processing control unit is fed from the common output terminal to the signal input component and recorded by the input component.

The component selection control system can be composed of a plurality of signal input components for receiving AV signals. The signal input components each have an on-off switch provided on a signal input line to be supplied with the AV signal from the signal processing control unit. The input signal lines are connected to one another at a point, which is connected to the common signal output terminal of the control unit.

In the case where desired one of the signal output components and desired one or more of the signal input components are selected to feed the AV signal to be delivered from the selected output component to the selected input component or components, the on-off switch in the selected output component is closed, the on-off switches of the other output components are opened, and the on-off switch in the signal input component is closed, whereby the AV signal delivered from the output component is fed to the common input terminal of the signal processing control unit through the closed on-off switch and further delivered from the control unit delivers through the common output terminal to the signal input component through the closed on-off switch thereof.

With the component selection control system of the invention described, the signal input lines extending from the respective signal input components are connected, as connected to one another, to the common output terminal of the signal processing control unit, so that the numbers of signal lines and terminals to be connected to the common output terminal are reduced from the corresponding numbers of lines and terminals conventionally used to a fraction of the number of signal input components.

The component selection control system of the invention is greatly reduced in the number of signal lines and terminals conventionally required for the connection of components. This diminishes the area to be occupied by the terminal portion of the signal processing control unit, not only making the system smaller in size but also ensuring a reduced cost and facilitating the signal line connection procedure to be performed by the user owing to a reduction in the number of signal lines.

DETAILED DESCRIPTION OF EMBODIMENT

The present invention as embodied into an audio component system will be described below in detail with reference to the drawings.

Figure 1:
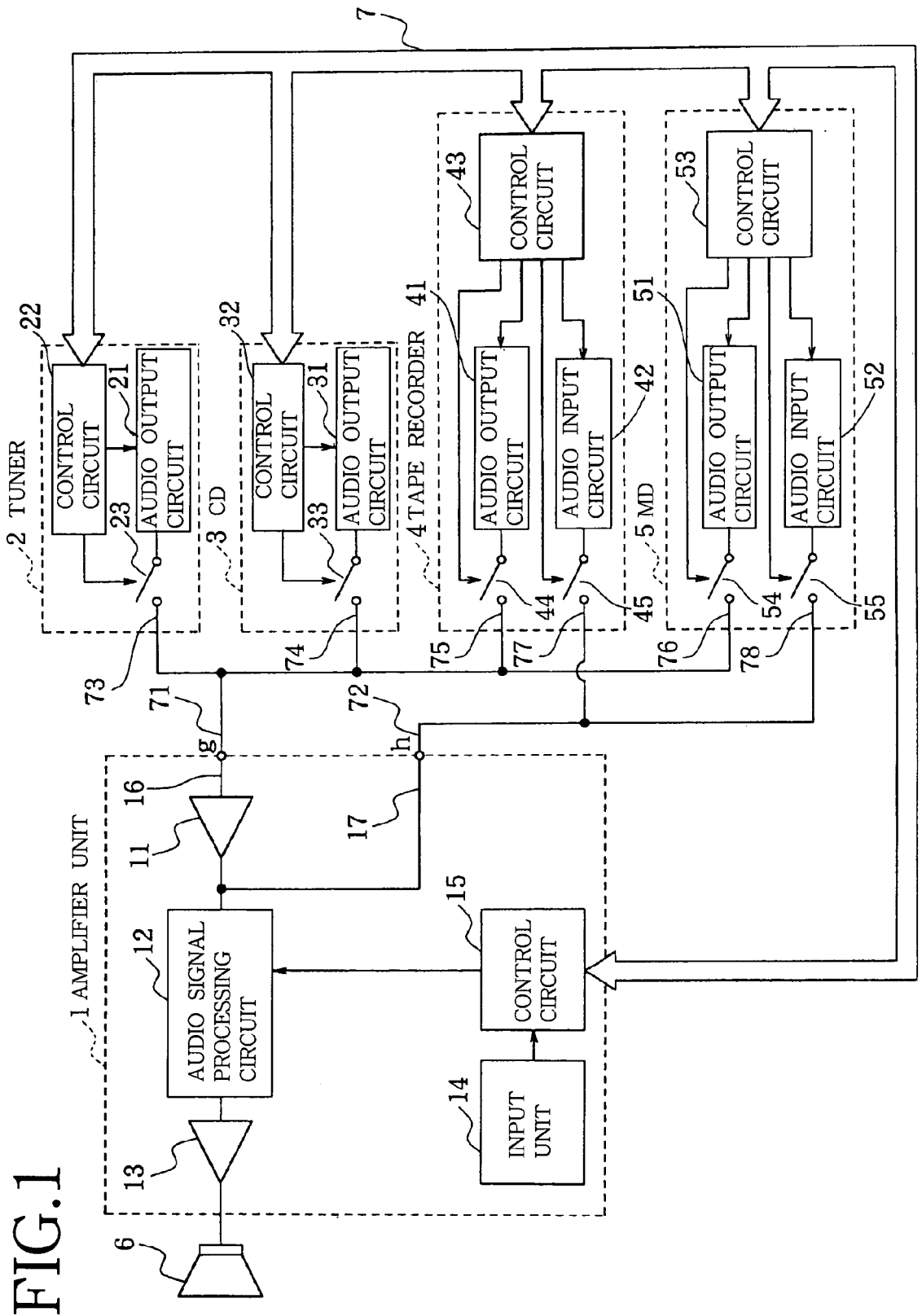
FIG. 1 is a block diagram showing the construction of an audio component system embodying the invention.

As shown in FIG. 1, the audio component system embodying the invention comprises audio components, i.e., a tuner 2, CD player 3, tape recorder 4 and MD player 5, which are connected to an amplifier unit 1. A speaker 6 is connected to the output terminal of the amplifier unit 1 for delivering as its sound output an audio signal sent out from one audio output component selected by the amplifier unit 1, e.g., from the CD player 3. Further one audio output component selected by the amplifier unit 1, e.g., the tuner 2, feeds an audio signal to one audio input component, e.g., to the MD player 5, which records the audio signal.

The tuner 2 comprises an audio output circuit 21 for regenerating an audio signal from broadcast waves received and outputting the signal, an on-off switch 23 provided on a signal output line 73 extending from the audio output circuit 21, and a control circuit 22 for controlling the operation of the circuit 21 and the switch 23.

The CD player 3 comprises an audio output circuit 31 for regenerating an audio signal from a CD and outputting the signal, an on-off switch 33 provided on a signal output line 74 extending from the audio output circuit 31, and a control circuit 32 for controlling the operation of the circuit 31 and the switch 33.

The taper recorder 4 comprises an audio output circuit 41 for regenerating an audio signal from a magnetic tape and outputting the signal, an audio input circuit 42 for recording an audio signal on a magnetic tape, an on-off switch 44 provided on a signal output line 75 extending from the audio output circuit 41, an on-off switch 45 provided on a signal input line 77 extending from the audio input circuit 42, and a control circuit 43 for controlling the operation of the output circuit 41, the input circuit 42 and the switches 44, 45.

The MD player 5 comprises an audio output circuit 51 for regenerating an audio signal from an MD and outputting the signal, an audio input circuit 52 for recording an audio signal on an MD, an on-off switch 54 provided on a signal output line 76 extending from the audio output circuit 51, an on-off switch 55 provided on a signal input line 78 extending from the audio input circuit 52, and a control circuit 53 for controlling the operation of the output circuit 51, the input circuit 52 and the switches 54, 55.

The signal output lines 73 to 76 extending from the audio output circuits 21, 31, 41, 51 are connected to one another at a point, which is connected to a common signal line 71. The signal line 71 is connected to a common input terminal g provided on the amplifier unit 1. The signal input lines 77, 78 extending from the audio input circuits 42, 52 are connected to each other at a point, which is connected to a common signal line 72. The signal line 72 is connected to a common input terminal h provided on the amplifier unit 1.

The amplifier unit 1 comprises a signal processing system 16 comprising a preamplifier 11, an audio signal processing circuit 12 and a post amplifier 13 and connected to the common input terminal g. The audio signal passed through the signal processing system 16 is delivered to the speaker 6. The output terminal of the preamplifier 11 is further connected to the common output terminal h by a signal output line 17. The audio signal output from the common output terminal h is fed to the tape recorder 4 or the MD player 5 through the common signal line 72 and the signal input line 77 or 78.

For simplified illustration, FIG. 1 shows the signal output lines 73 to 76, the signal input lines 77, 78 and the common signal lines 71, 72 each in the form of a single signal line, whereas these signal lines each comprise three conductors, i.e., a left-channel signal conductor, right-channel signal conductor and ground conductor.

An input unit 14 which is to be manipulated by the user is connected to a control circuit 15, which is connected by a control bus 7 to the control circuits 22, 32, 43, 53 included in the respective components 2 to 5 to realize an operation specified by the user's manipulation.

For example, when the audio signal to be output by the CD player 3 is to be recorded on an MD by the MD player 5, the input unit 14 is manipulated to select the CD player 3 as a signal output component and the MD player 5 as a signal input component, whereupon the control circuit 15 of the amplifier unit 1 feeds control signals to the respective control circuits 22, 32, 43, 53 of the components 2 to 5, causing the control circuits 22, 32, 43, 53 to turn on or off the respective on-off switches 23, 33, 44, 45, 54, 55. Stated more specifically, the switch 33 of the CD player 3 is turned on, and the switch 23 of the tuner 2, the switch 44 for the audio output circuit 41 of the tape recorder 4 and the switch 54 for the audio output circuit 51 of the MD player 5 are turned off. Further the switch 55 for the audio input circuit 52 of the MD player 5 is turned on.

As a result, the audio signal delivered from the audio output circuit 31 of the CD player 3 is fed to the common input terminal g of the amplifier unit 1 via the switch 33, signal output line 74 and common signal line 71. The audio signal fed to the terminal g is amplified by the preamplifier 11 and then delivered from the common output terminal h via the signal output line 17.

Even if an audio signal is output from the audio output circuit 21 of the tuner 2, the audio output circuit 41 of the tape recorder 4 or the audio output circuit 51 of the MD player 5 at this time, the signal will not flow into the common signal line 71 since the switches 23, 44, 54 are off.

The audio signal delivered from the common output terminal h of the amplifier unit 1 is passed through the common signal line 72 to the signal input line 78 of the MD player 5 and further fed to the audio input circuit 52 via the switch 55 to record the audio signal on the MD.

Incidentally, the audio signal delivered from the common output terminal h of the amplifier unit 1 can be recorded on both the magnetic tape and the MD at the same time by closing the switch 45 of the tape recorder 4 and the switch 55 of the MD player 5 and setting both the taper recorder 4 and the MD player 5 in a recording mode.

Figure 2:
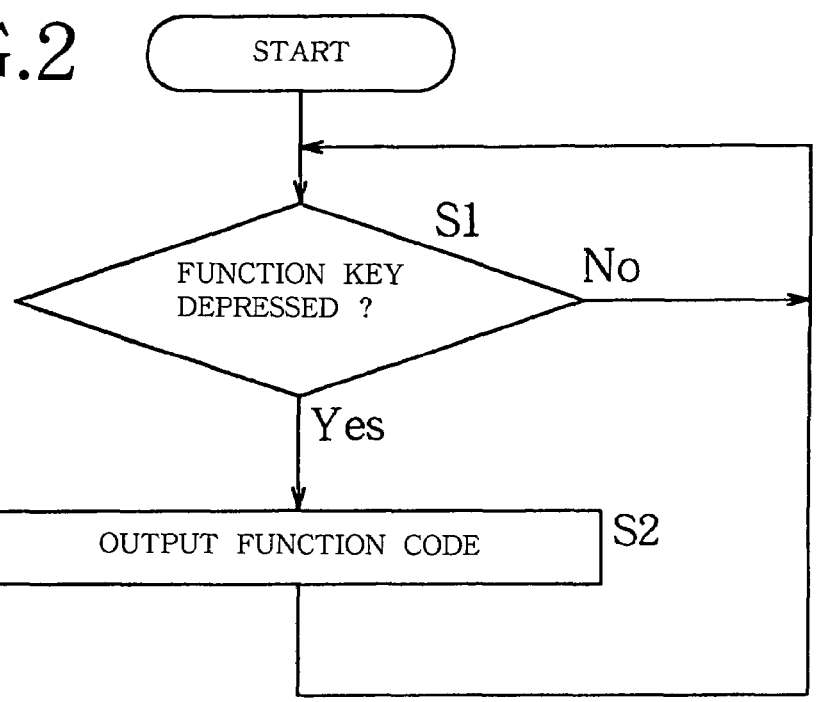
FIG. 2 is a flow chart showing the operation of a control circuit of an amplifier unit constituting the audio component system.
Figure 3:
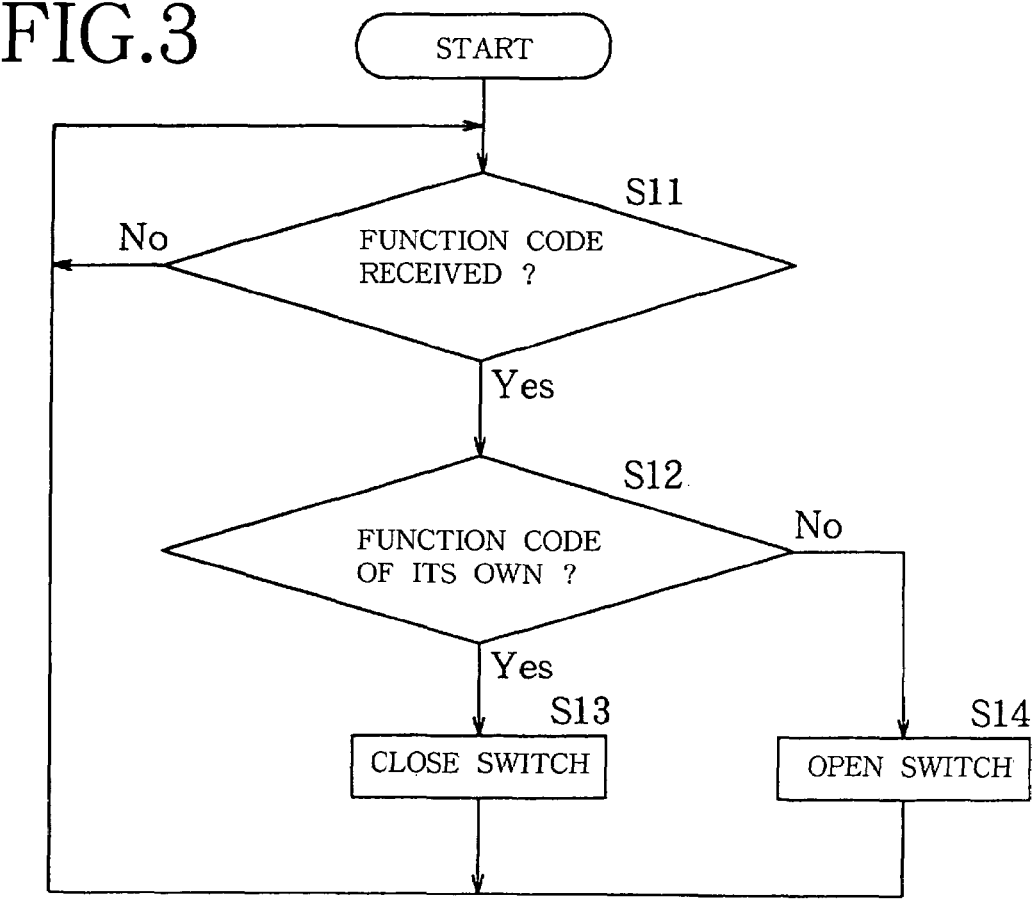
FIG. 3 is a flow chart showing the operation of a control circuits of components constituting the system.
Figure 4:
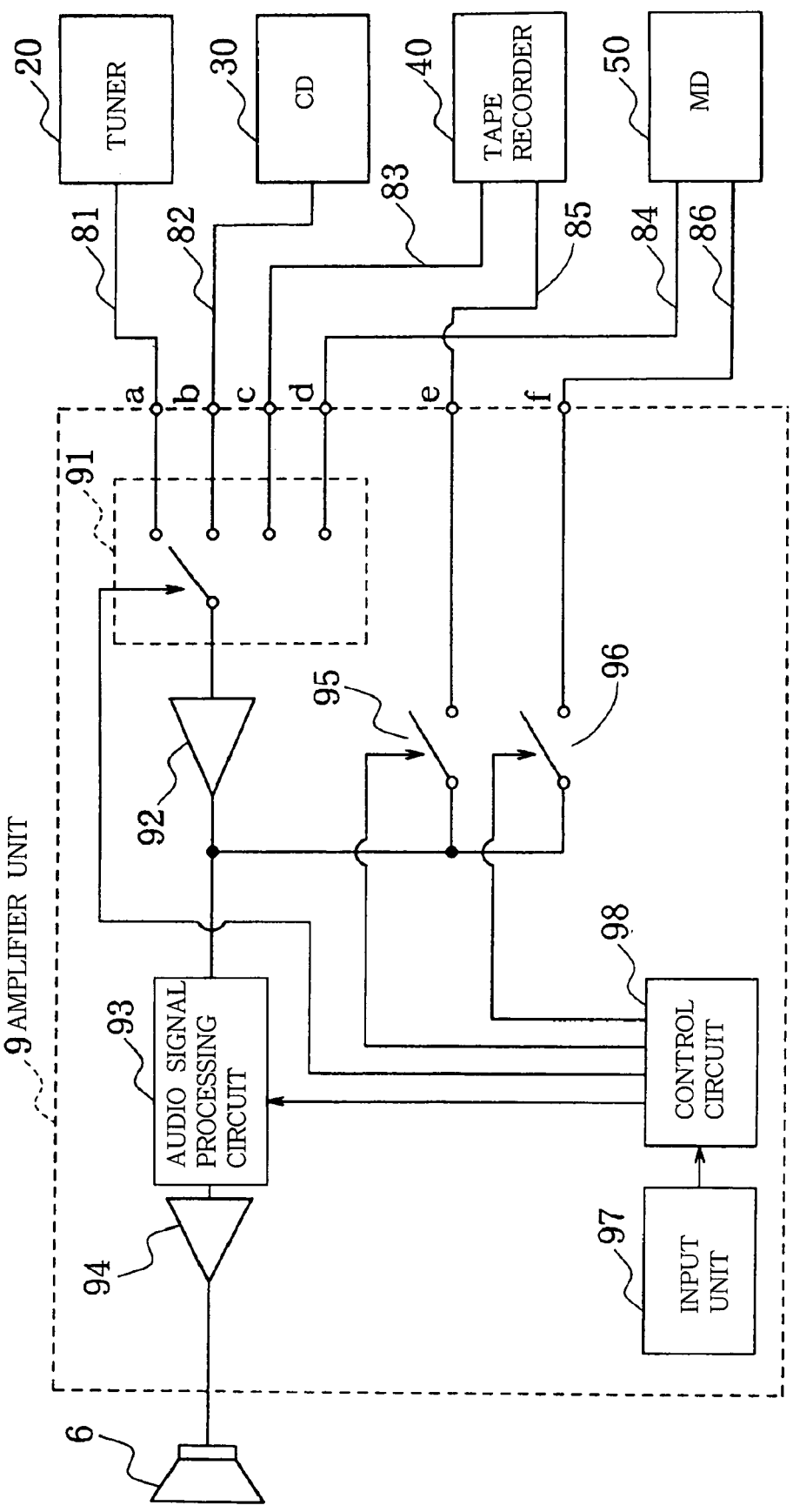
FIG. 4 is a block diagram showing the construction of a conventional audio component system.

FIG. 2 shows the control operation of the control circuit 15 of the amplifier unit 1 in the audio component system, and FIG. 3 shows the control operation of the control circuits 22, 32, 43, 53.

With reference to FIG. 2, the control circuit 15 of the amplifier unit 1 first inquires in step S1 whether one of function keys on the input unit 14 has been depressed. When the answer is affirmative, step S2 follows to output a function code corresponding to the depressed function key. The sequence thereafter returns to step S1 to wait for the depression of function key.

With reference to FIG. 3, on the other hand, each of the control circuits 22, 32, 43, 53 of the components inquire first in step S11 whether the function code has been received. When the answer is affirmative, step S12 follows, in which the control circuit inquires whether the function code is addressed to itself. When the answer is affirmative, the circuit closes the on-off switch of its own, whereas if the answer is negative, the circuit opens the on-off switch of its own. Step S11 then follows to wait for the reception of a function code.

According to the control procedures described above, the user manipulates the input unit 14 of the amplifier unit 1 to select the desired signal output component and also select the desired signal input component, whereby the audio signal delivered from the desired output component can be fed to the desired input component for recording.

With the audio component system of the present invention shown in FIG. 1, the signal output lines 73 to 76 extending from the respective signal output components 2 to 5 are connected, as connected to one another, to the common signal line 71, while the signal input lines 77, 78 extending from the respective signal input components 4, 5 are connected, as connected to each other, to the common signal line 72, so that even in the case where the signal output lines and the signal input lines each comprise three conductors, i.e., a left-channel signal conductor, right-channel signal conductor and ground conductor, only three conductors, i.e., left-channel signal conductor, right-channel signal conductor and ground conductor, need to be used for each of the common signal lines 71, 72 to be connected respectively to the common input terminal g and the common output terminal h of the amplifier unit 1, with three terminals provided on the amplifier unit 1 for use as the common input and output terminals g, h for connection to the three signal conductors.

The number of common signal lines and the number of common input terminal and common output terminal remain unincreased even if the system comprises an increased number of components. Accordingly the space required for providing the common input and output terminals on the amplifier unit 1 can be much smaller than in the prior art wherein an input terminal and an output terminal are provided for each component. This diminishes the size of the amplifier unit 1.

The reduction in the number of signal lines to be connected to the amplifier unit 1 not only entails a reduced parts cost but also facilitates the signal line connecting procedure to be performed by the user. Further with the embodiment shown in FIG. 1, each component has an on-off switch and a control circuit for controlling the switch of its own, so that additional components are connectable to the system easily. The system is highly amenable to expansion.

The system of the invention is not limited to the foregoing embodiment in construction but can be modified variously by one skilled in the art without departing from the spirit of the invention as set forth in the appended claims. For example, it is possible to construct a component selection control system which includes a VCR, DVD or like video device as its component. In this case, the signal processing system may comprise a video processing circuit for displaying video signals on an image monitor in place of the audio signal processing circuit 12 and amplifiers 11, 13.

What is claimed is:

1. A component selection control system comprising a plurality of signal output components for outputting AV signals including audio signals and/or video signals, a plurality of signal input components for receiving the AV signal, and a signal processing control unit having connected thereto the signal output components and the signal input components, the signal processing control unit being operable to process the AV signal delivered from desired one of the signal output components as required for audio and/or video reproduction and to feed the AV signal delivered from the desired signal output component to desired one or more of the signal input components, the component selection control system being characterized in that:

each of the signal output components has a separate and independent on-off switch provided on a signal output line for delivering the AV signal to the signal processing control unit therethrough, each of the signal input components having an on-off switch provided on a signal input line for receiving the AV signal from the signal processing control unit therethrough, and a control circuit for setting a recording mode, the signal processing control unit having a common input terminal for receiving the AV signal from the desired signal output component and a common output terminal for delivering the AV signal to the desired signal input component, the signal output lines of the signal output components being connected to one another at a point connected to the common input terminal of the signal processing control unit, the signal input lines of the signal input components being connected to one another at a point connected to the common output terminal of the signal processing control unit, the on-off switches being controllable for opening or closing to select one signal output component for feeding its AV signal to the signal processing control unit and to select one or more of the signal input components for receiving the AV signal from the signal processing control unit, wherein when more than one signal input component is selected then more than one on-off switch is turned on and more than one signal input component may be accessed at any given moment in time, wherein the audio signal from the signal output component can be recorded on a recording medium of at least two signal input components at the same time by closing the on-off switch of said signal input components at the same time and setting said signal input components in the recording mode by control circuits thereof.

2. A component selection control system according to claim 1 wherein the AV signal to be delivered from the signal output component and fed to the signal input component is an audio signal, and the signal processing control unit comprises an amplifier circuit for amplifying the audio signal received by the common input terminal and feeding the resulting signal to a subsequent speaker, and a signal feed line for feeding therethrough the audio signal received by the common input terminal.

3. A component selection control system according to claim 1 wherein each of the signal output components and the signal input components has a control circuit for controlling the on-off switch thereof for opening or closing, and the control circuit prepares a control signal for the on-off switch in response to a command from a control circuit included in the signal processing control unit.

* * * * *